US011435845B2

(12) United States Patent
Rosenbaum et al.

(10) Patent No.: US 11,435,845 B2
(45) Date of Patent: Sep. 6, 2022

(54) GESTURE RECOGNITION BASED ON SKELETAL MODEL VECTORS

(71) Applicant: Vulcan Inc., Seattle, WA (US)

(72) Inventors: Omer Rosenbaum, Kirkland, WA (US); Richard Earl Simpkinson, Issaquah, WA (US); Rusty Allen Gerard, Bothell, WA (US); Shamyl Emrich Zakariya, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/855,911

(22) Filed: Apr. 22, 2020

(65) Prior Publication Data
US 2020/0341580 A1   Oct. 29, 2020

Related U.S. Application Data

(60) Provisional application No. 62/837,666, filed on Apr. 23, 2019.

(51) Int. Cl.
*G06F 3/041* (2006.01)
*G06N 3/08* (2006.01)

(52) U.S. Cl.
CPC ............ *G06F 3/0416* (2013.01); *G06N 3/08* (2013.01)

(58) Field of Classification Search
CPC ......... G06F 3/0416; G06F 3/017; G06N 3/08; G06K 9/6273; G06K 9/00335; G06K 9/00657; G06K 9/00791; G06K 2209/17; G06K 2009/6295; A01D 46/30; A01D 46/00; G01C 22/00; G01D 5/12; G01N 33/0098; G01S 19/39; G06V 10/82; G06V 40/20
See application file for complete search history.

(56) References Cited

U.S. PATENT DOCUMENTS

| 6,080,063 | A | 6/2000 | Khosla |
| 8,384,542 | B1 | 2/2013 | Merrill et al. |
| 9,782,668 | B1 | 10/2017 | Golden et al. |
| D817,195 | S | 5/2018 | Iyengar |
| 10,143,925 | B2 | 12/2018 | Middleton |
| 10,192,126 | B2 * | 1/2019 | Yamanaka ................ G06T 7/75 |
| 10,279,264 | B1 | 5/2019 | Aghdaie et al. |

(Continued)

FOREIGN PATENT DOCUMENTS

CN    107897068 A    4/2018

OTHER PUBLICATIONS

International Invitation to Pay Additional Fees dated Jun. 2, 2020, in International Patent Application No. PCT/US2020/016882, filed Feb. 5, 2020, 21 pages.

(Continued)

*Primary Examiner* — Grant Sitta
(74) *Attorney, Agent, or Firm* — Davis Wright Tremaine LLP (57) ABSTRACT

A system for recognizing gestures generates a skeletal model from video data of a subject. A defined subset of attributes of the skeletal model are mapped to defined positions of a vector. A gesture is recognized by evaluating a neural network using the vector as input. The neural network, trained using training vectors generated according to the definitions of skeletal model attributes and vector positions, classifies a gesture based on the input vector.

20 Claims, 6 Drawing Sheets

(56) References Cited

U.S. PATENT DOCUMENTS

| | | | |
|---|---|---|---|
| 10,579,869 B1* | 3/2020 | Xiong | G06N 3/088 |
| 10,675,536 B2 | 6/2020 | Chen | |
| 10,839,203 B1* | 11/2020 | Guigues | G06T 7/251 |
| 11,036,303 B2* | 6/2021 | Rani | G01S 13/56 |
| 11,132,606 B2* | 9/2021 | Taylor | G06T 13/40 |
| 11,249,179 B2* | 2/2022 | Hamasaki | G01S 13/62 |
| 2006/0223635 A1 | 10/2006 | Rosenberg | |
| 2009/0005140 A1 | 1/2009 | Rose et al. | |
| 2011/0216060 A1 | 9/2011 | Weising et al. | |
| 2011/0298827 A1* | 12/2011 | Perez | G06K 9/00355 |
| | | | 345/647 |
| 2011/0301934 A1* | 12/2011 | Tardif | G09B 21/009 |
| | | | 704/1 |
| 2012/0083325 A1 | 4/2012 | Heatherly | |
| 2012/0281181 A1 | 11/2012 | Chen et al. | |
| 2013/0077820 A1* | 3/2013 | Marais | G06K 9/6257 |
| | | | 382/103 |
| 2014/0032034 A1 | 1/2014 | Raptopoulos et al. | |
| 2014/0253590 A1 | 9/2014 | Needham et al. | |
| 2014/0267008 A1* | 9/2014 | Jain | G06F 3/017 |
| | | | 345/156 |
| 2014/0310595 A1 | 10/2014 | Acharya et al. | |
| 2015/0177842 A1* | 6/2015 | Rudenko | G06F 21/32 |
| | | | 345/156 |
| 2016/0078289 A1* | 3/2016 | Michel | G06K 9/00355 |
| | | | 345/156 |
| 2016/0086349 A1* | 3/2016 | Shotton | G06T 7/75 |
| | | | 382/103 |
| 2016/0180468 A1 | 6/2016 | Buss et al. | |
| 2016/0243434 A1 | 8/2016 | Yim et al. | |
| 2016/0328604 A1* | 11/2016 | Bulzacki | G06Q 10/063 |
| 2017/0148339 A1 | 5/2017 | Van Curen et al. | |
| 2017/0168586 A1* | 6/2017 | Sinha | G06N 20/00 |
| 2017/0190051 A1 | 7/2017 | O'Sullivan et al. | |
| 2017/0193708 A1 | 7/2017 | Lyons et al. | |
| 2017/0208493 A1 | 7/2017 | Masson et al. | |
| 2017/0212210 A1 | 7/2017 | Chen et al. | |
| 2017/0280678 A1 | 10/2017 | Jones et al. | |
| 2017/0293824 A1 | 10/2017 | Chen et al. | |
| 2017/0313421 A1 | 11/2017 | Gil | |
| 2017/0344859 A1* | 11/2017 | Mo | G06K 9/627 |
| 2017/0358144 A1* | 12/2017 | Schwarz | G06T 19/006 |
| 2018/0024641 A1* | 1/2018 | Mao | G06K 9/00389 |
| | | | 382/103 |
| 2018/0093186 A1 | 4/2018 | Black et al. | |
| 2018/0122043 A1 | 5/2018 | Energin et al. | |
| 2019/0038222 A1 | 2/2019 | Krimon et al. | |
| 2019/0217198 A1 | 7/2019 | Clark et al. | |
| 2019/0221035 A1 | 7/2019 | Clark et al. | |
| 2019/0325605 A1 | 10/2019 | Ye et al. | |
| 2019/0383903 A1* | 12/2019 | Chao | G01S 7/36 |
| 2020/0005028 A1* | 1/2020 | Gu | G06N 3/08 |
| 2020/0050342 A1* | 2/2020 | Lee | G06T 13/20 |
| 2020/0057425 A1* | 2/2020 | Seibert | B33Y 50/02 |
| 2020/0160535 A1 | 5/2020 | Ali Akbarian et al. | |
| 2020/0238177 A1 | 7/2020 | Black et al. | |
| 2020/0289922 A1 | 9/2020 | McCoy et al. | |
| 2020/0394393 A1* | 12/2020 | Kraft | G06K 9/00335 |

OTHER PUBLICATIONS

International Search Report and Written Opinion dated Jul. 23, 2020, Patent Application No. PCT/US2020/016882, 19 pages.

Charles, "GPS Goes Mainsteam," NPR, Dec. 26, 2007, 7 pages.

Langley et al., "Approaches to Machine Learning," Department of Computer Science Carnegie-Mellon University, Feb. 16, 1984, 28 pages.

* cited by examiner

GESTURE RECOGNITION BASED ON SKELETAL MODEL VECTORS

CROSS-REFERENCE TO RELATED APPLICATIONS

This application claims the benefit of U.S. Provisional Patent Application No. 62/837,666, filed Apr. 23, 2019, the disclosure of which is herein incorporated by reference in its entirety.

BACKGROUND

Increasingly, human-computer interaction is being driven by new forms of user input, including those that do not involve a user's direct interaction with a traditional input device, such as a mouse or keyboard. One such means of providing human-computer interaction is gesture recognition. In gesture recognition, a computing device observes, classifies, and responds to various positions and movements performed by a user. When a particular gesture is recognized, the computing device may interpret the gesture as a command and respond accordingly. However, technology for gesture recognition may be improved.

BRIEF DESCRIPTION OF THE DRAWINGS

Various techniques will be described with reference to the drawings, in which.

DETAILED DESCRIPTION

Techniques and systems described herein relate to improvements to gesture recognition based on skeletal models, and to the improvement of techniques for generating skeletal models. The gesture recognition techniques involve the use of a skeletal model vector as input to a gesture classifier. By classifying a gesture, the techniques and system are able to recognize gestures that correspond to commands, and further are able to distinguish between such commands and those motions and positions which are not intended to be interpreted as specific gestures.

In at least one embodiment, a system for performing gesture classification comprises a computing device that obtains image data, generates a skeletal model from the image data, and then generates a skeletal model vector from selected portions of the skeletal model. The skeletal model vector is used by the computing device as input to a neural network trained to perform gesture classification and recognition using training vectors mapped to the same portions of the skeletal model.

In at least one embodiment, multiple skeletal models are generated and a consensus model is used to generate the skeletal vector. For example, in at least one embodiment, a generalized skeletal model is used to represent a subject's complete pose, and one or more additional skeletal models are used to represent particular aspects of the subject, such as the subject's hands or facial expression.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
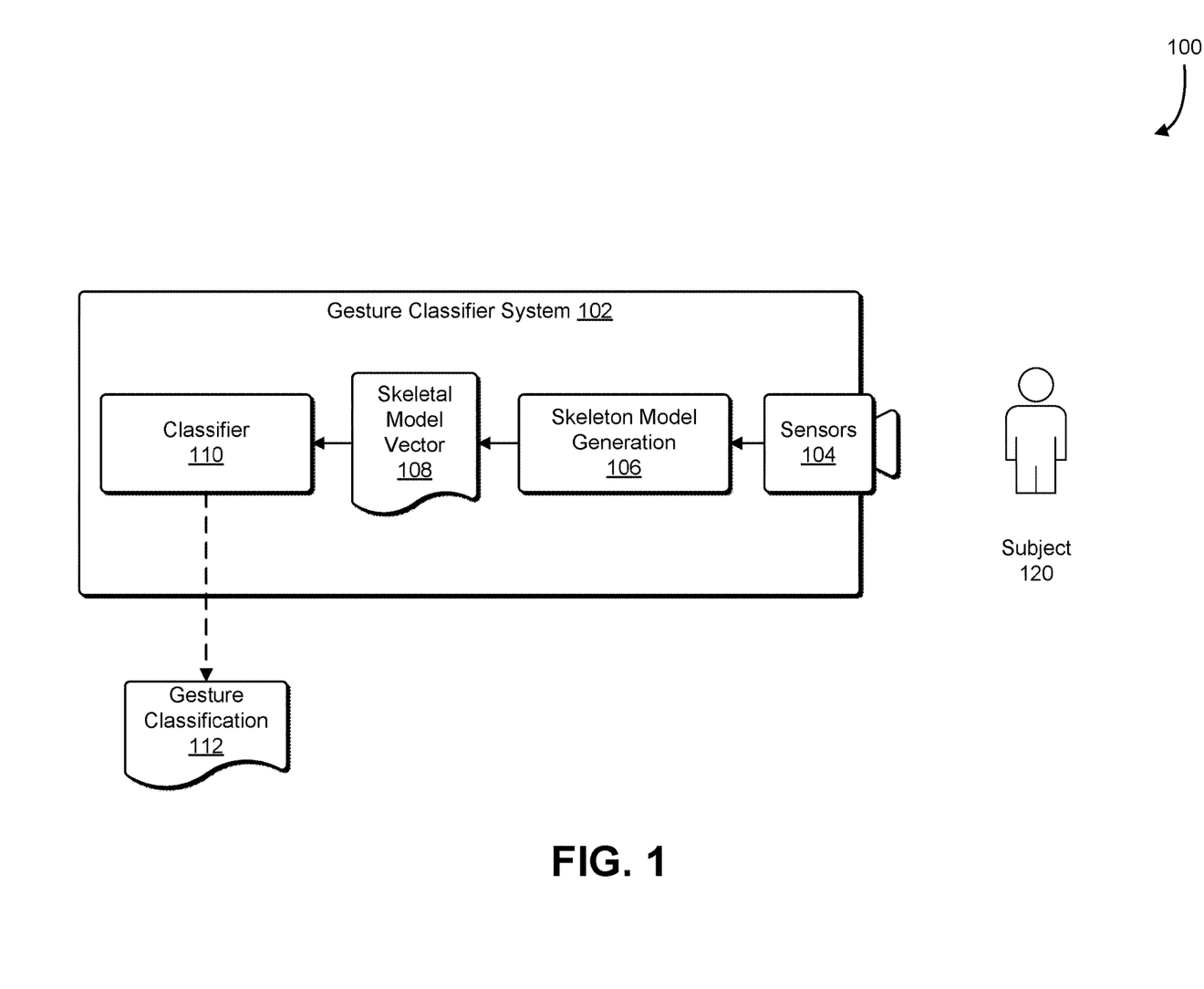
FIG. 1 illustrates an example process for gesture detection using skeletal model vectors, in accordance with an embodiment.

FIG. 1 illustrates an example process for gesture detection using skeletal model vectors, in accordance with an embodiment. In the depicted example 100, a gesture classification system 102 classifies a gesture performed by the subject 120. In at least one embodiment, gesture classification identifies, e.g., recognizes, a gesture performed by the subject 120. Output from the gesture classification system may be used, in conjunction with various embodiments, to perform an action in response to the subject's gesture.

In at least one embodiment, a gesture classification system 102 is implemented by one or more processors and executable instructions which implement skeletal model generation 106 and classifier 110 modules. As used herein, a module refers to processor executable instructions that, when executed by one or more processors, cause a computing device comprising the processor to perform a function attributed herein to the module. In at least one embodiment, the gesture classification system is a module comprising the skeletal model generation 106 and classifier 110 modules.

Examples of gestures include, but are not limited to, clapping, waving, pointing, emphasizing a point of speech, and so forth. It will be appreciated that these examples are intended to be illustrative, and as such should not be construed in a manner that would limit the scope of the present disclosure to only those embodiments that include or practice the specific examples provided. A gesture may be recognized, using systems and techniques described herein, based on one or more images, or frames, of video data that capture a subject's pose. The subject's pose may refer to the subject's position, orientation, and movement.

In the example 100, one or more sensors 104 collect data pertaining to the subject 120. The data may be captured while the subject 120 is in motion, and may be performing a gesture. In at least one embodiment the gesture classification system 102 classifies movements as not involving a recognized gesture, or as involving a recognized gesture.

In at least one embodiment, the one or more sensors 104 comprise one or more cameras, including but not necessarily limited to those that operate in the visual and infrared wavelengths. In at least one embodiment, the one or more sensors 104 comprise one or more other sensor types, such as light detection and ranging ("LIDAR") sensors. It will be appreciated that these examples are intended to be illustrative, and as such should not be construed in a manner that would limit the scope of the present disclosure to only those embodiments that include or practice the specific examples provided.

In at least one embodiment, a skeletal model generation module 106 processes data acquired by the sensors to generate a skeletal model of the subject 120. In at least one embodiment, the skeletal model generated by the skeletal model generation module 106 comprises a wireframe or stick figure module of the subject 120. For example, a skeletal module may comprise a tree-based data structure whose nodes represent joints and bones, and edges represent connections between joints and bones. Attributes of the nodes or edges can be used to represent orientations or positions of the bones.

In at least one embodiment, movement of the subject 120 is represented by the skeletal model, or by a plurality of such models taken at successive frames. The movement represented by the skeletal model, or skeletal models, may comprise a gesture that is to be classified.

In at least one embodiment, a skeletal model vector 108 is generated based on one or more of the skeletal models. The skeletal model vector 108 comprises a set of key components of the skeleton, particularly those including certain aspects to be used by the classifier 110 to recognize a gesture.

In at least one embodiment, a skeletal model vector 108 comprises a vector of angles, where each position in the vector corresponds to a predefined joint. For example, in the vector {0.5°, 12°, 23° }, the 0.5° value might be pre-defined as corresponding to the angle of a subject's right wrist, 12° as the angle of the subject's right elbow, and 23° as the angle of the subject's right arm at the shoulder. In at least one embodiment, the vector is comparatively compact, compared to the skeletal model(s). Compactness of the vector, in at least one embodiment, conveys technical advantage related to efficient training and use of a classifier 110.

In at least one embodiment, a skeletal model vector 108 is provided as input to a classifier 110. In an embodiment, the classifier 110 is an artificial neural network. In at least one embodiment, the classifier 110 is a deep learning network. In at least one embodiment, the classifier 110 is some other classification algorithm.

In at least one embodiment, a classifier 110 is trained to classify gestures 112 based on one or more skeletal model vectors 108 provided as input to the classifier 110. In at least one embodiment, use of skeletal model vectors, rather than direct use of a skeletal model, facilitates use of the skeletal model in gesture recognition. In at least one embodiment, using one or more skeletal model vectors 108 as inputs to classifier 110 facilitates training by providing a compact representation of the subject's 120 position or movement.

In an embodiment, gesture detection using skeletal model vectors may improve efficiency or accuracy over machine learning techniques which utilize image data as input. Likewise, gesture detection using skeletal model vectors may improve efficiency or accuracy over machine learning techniques based on direct use of skeletal models.

Figure 2:
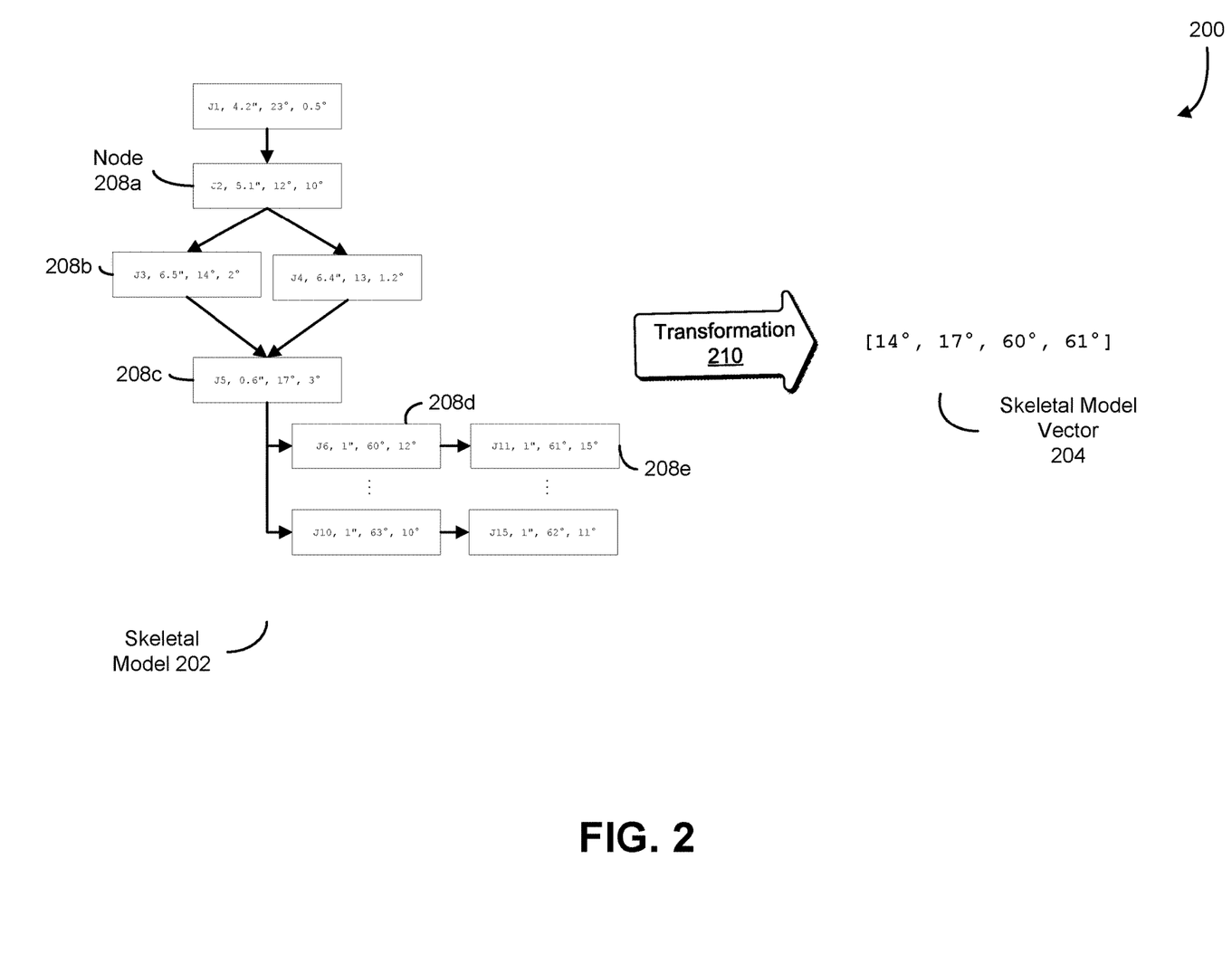
FIG. 2 illustrates an example of transforming a skeletal model to a skeletal model vector, in accordance with an embodiment.

FIG. 2 illustrates an example of transforming a skeletal model to a skeletal model vector, in accordance with an embodiment. As depicted in the example 200, a skeletal model 202, in at least one embodiment, comprises a tree of nodes. Each node in the tree structure represents a joint and its associated bone, and may include additional information indicative of an angle of a bone in the joint. In some cases and embodiments, a plurality of angles are included, in order to express orientation in a three-dimensional space. A node may also include information indicating the length of the bone. As an illustrative example, a node 208a might represent a joint and bone, labelled "J2," where the bone is 4.2" long and oriented in three-dimensions according to the angles $\alpha=12°$ and $\beta=10°$. In at least one embodiment, the bones represented by the skeletal model are representative rather than anatomical. For example, in at least one embodiment, the ulna and radius might be combined into a single bone in the skeletal model 202. Moreover, it will be appreciated that the example of a skeletal model depicted in FIG. 2 is intended to be an illustrative example of a skeletal model. As such, the example of a skeletal model provided by FIG. 2 should not be construed in a manner which would limit the scope of the present disclosure to include only those embodiments that include skeletal models conforming to the depicted example.

In at least one embodiment, a transformation 210 is applied to a skeletal model 202 to generate a skeletal model vector 204. In at least one embodiment, the transformation 210 comprises selecting specific parameters from the skeletal model, assigning those parameters to specific positions within a skeletal model vector, and populating the vector. For example, in at least one embodiment, angle parameters 14°, 17°, 60°, and 61° from nodes 208b, 208c, 208d, and 208e, respectively, are mapped to and populated in skeletal model vector 204, equal to [14°, 17°, 60°, and 61°]. Note that once established, the positions in the skeletal model are fixed. For example, once the mapping has been established, the first position in the vector would always represent the same parameter for joint "J3" from node 208b, even though the particular value might change over time. The selection of parameters for inclusion in the vector may be based, at least in part, on known, estimated, or potential relevance to the gestures that are to be classified.

Figure 3:
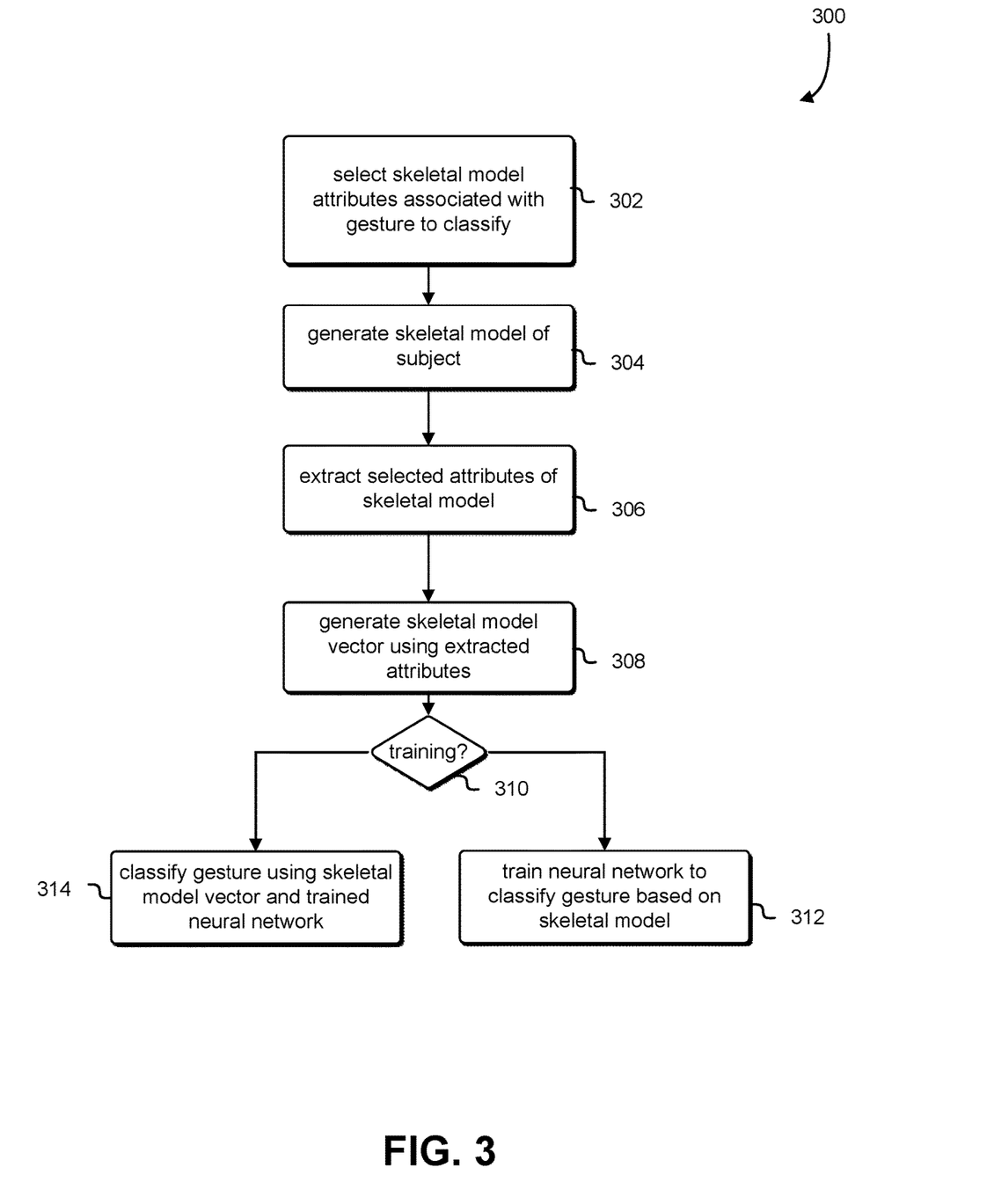
FIG. 3 illustrates an example process for gesture classification, in accordance with an embodiment.

FIG. 3 illustrates an example process for gesture classification, in accordance with an embodiment. Some or all of the process 300 (or any other processes described, or variations and/or combinations of those processes) may be performed at least partially under the control of one or more computer systems configured with executable instructions and/or other data, and may be implemented as executable instructions executing collectively on one or more processors. The executable instructions and/or other data may be stored on a non-transitory computer-readable storage medium, e.g., a computer program persistently stored on magnetic, optical, or flash media. Although the process 300 is depicted as a sequence of operations, the depicted sequence is not intended to limit potential embodiments to only those which perform operations conforming to the depicted order. For example, in various embodiments, the operations depicted in FIG. 3 may be reordered or performed in parallel, except where logically required, such as when the output from one operation is used as input to another operation. Moreover, in some embodiments, certain of the depicted operations may be combined, altered, or omitted.

In some cases, aspects of the process 300 are performed during training of a neural network, or other classifier, that is to perform gesture classification. In such cases, the depicted process may be repeated for a variety of subjects and gestures, and the network or other classifier refined with each iteration. Various few-shot training methods may also be used. In other cases, aspects of the process 300 are performed, using the trained neural network, to classify gestures. Note that the process described by FIG. 3 is applicable to techniques other than classification. For example, the process described by FIG. 3, and various other techniques described herein, are also applicable to train a neural network, or other learning or artificial intelligence algorithm, to solve regression problems related to an observed gesture.

At 302, skeletal model attributes are selected. The selected skeletal model attributes may be those attributes of the model that are associated with a gesture that is to be classified. In at least one embodiment, the attributes are selected based on analysis of one or more gestures that a neural network is to be trained to recognize. In at least one embodiment, the attributes of the model are selected by a neural network trained to select relevant attributes. In at least one embodiment, this neural network and the neural network that is to do the classification are jointly trained. In at least one embodiment, attributes are selected by observation and experimentation.

Figure 5:
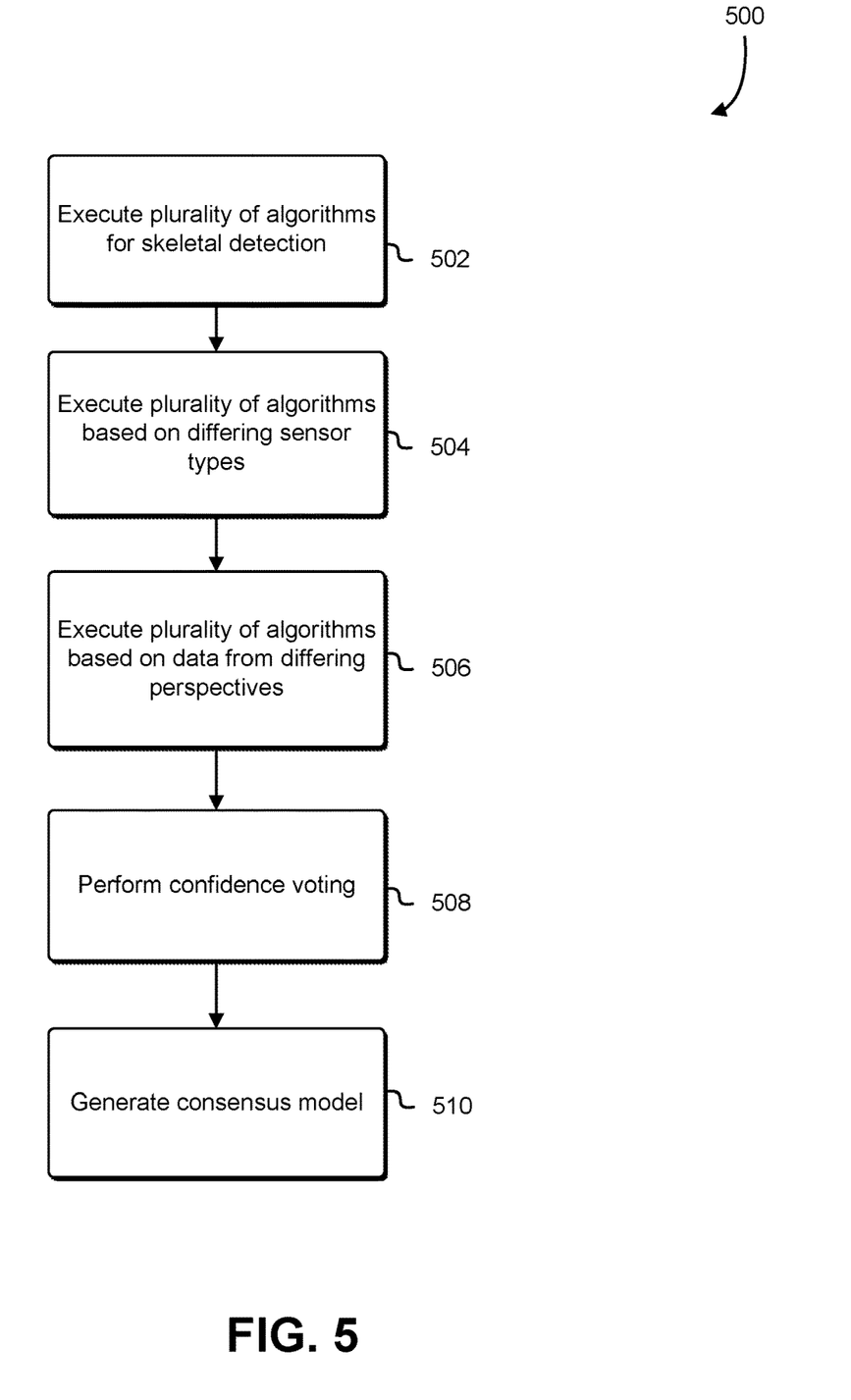
FIG. 5 illustrates an example process for improving skeletal model generation, in accordance with an embodiment.

At 304, a skeletal model is generated. In at least one embodiment, video data obtained from cameras or other sensors is used as input to a skeletal model generation module, such as the skeletal model generation module 106 depicted in FIG. 1. A variety of techniques may be used to generate the skeletal model. In at least one embodiment, a technique similar to the one described in relation to FIG. 5 is used.

At 306, attributes of the skeletal model are extracted from the skeletal model for use in a skeletal model vector. In at least one embodiment, attributes selected at step 302 are copied from the skeletal model to a target memory location, such as a defined location in the skeletal model vector, as described in relation to step 308. The attribute is extracted, for both training and inference purposes, from the same location within the model, so that the value represents the same bone or joint for both the training and use of the neural network.

At 308, a skeletal model vector is generated using the extracted value of the attribute. In at least one embodiment, this involves copying the value of an attribute of the model to a location in the vector. In at least one embodiment, this is done according to a mapping that is fixed for both training and inference purposes. As such, each position in the vector is associated with a particular feature of the skeletal model, such as a particular joint or bone, and this meaning is fixed during both training and use of the neural network.

As illustrated by element 310, the process 300 may apply to both training and use of a neural network, or other artificial intelligence or learning algorithm.

At 312, during training, a neural network is trained using the skeletal model vector generated at step 308. In at least one embodiment, training a neural network comprises iterative execution of a neural network using skeletal model vectors as input. In each iteration, a skeletal model vector is input to the neural network, the successive layers and output of the neural network is calculated, and an error signal is generated and used to adjust the weights and other parameters of the neural network. During training, the skeletal model vector is generated from an image, or directly from a skeletal model, that corresponds to a gesture whose classification is known. In this way, the error signal can be determined based on the difference between the output and a label associated with the input vector.

At 314, a gesture is classified using a skeletal model vector generated at step 308. Here, a skeletal model vector generated from a subject performing an unclassified gesture, or possibly not performing any gesture, is input to a trained neural network. In at least one embodiment, the output of the neural network classifies the gesture, and accordingly the gesture is recognized.

Note that FIG. 3, and other techniques described herein, are sometimes described with reference to a single skeletal model vector, corresponding to a skeletal model generated from a single frame of video. However, the techniques described in relation to FIG. 3, and elsewhere in this disclosure, may apply to multiple skeletal model vectors, corresponding to a skeletal model generated and updated for multiple frames of video. For example, skeletal model vectors may be generated to represent the state of a skeletal model at times $T_1, T_2, \ldots T_n.1$, and then provided, e.g. as a multidimensional skeletal model vector, to a neural network during training and inference.

Figure 4:
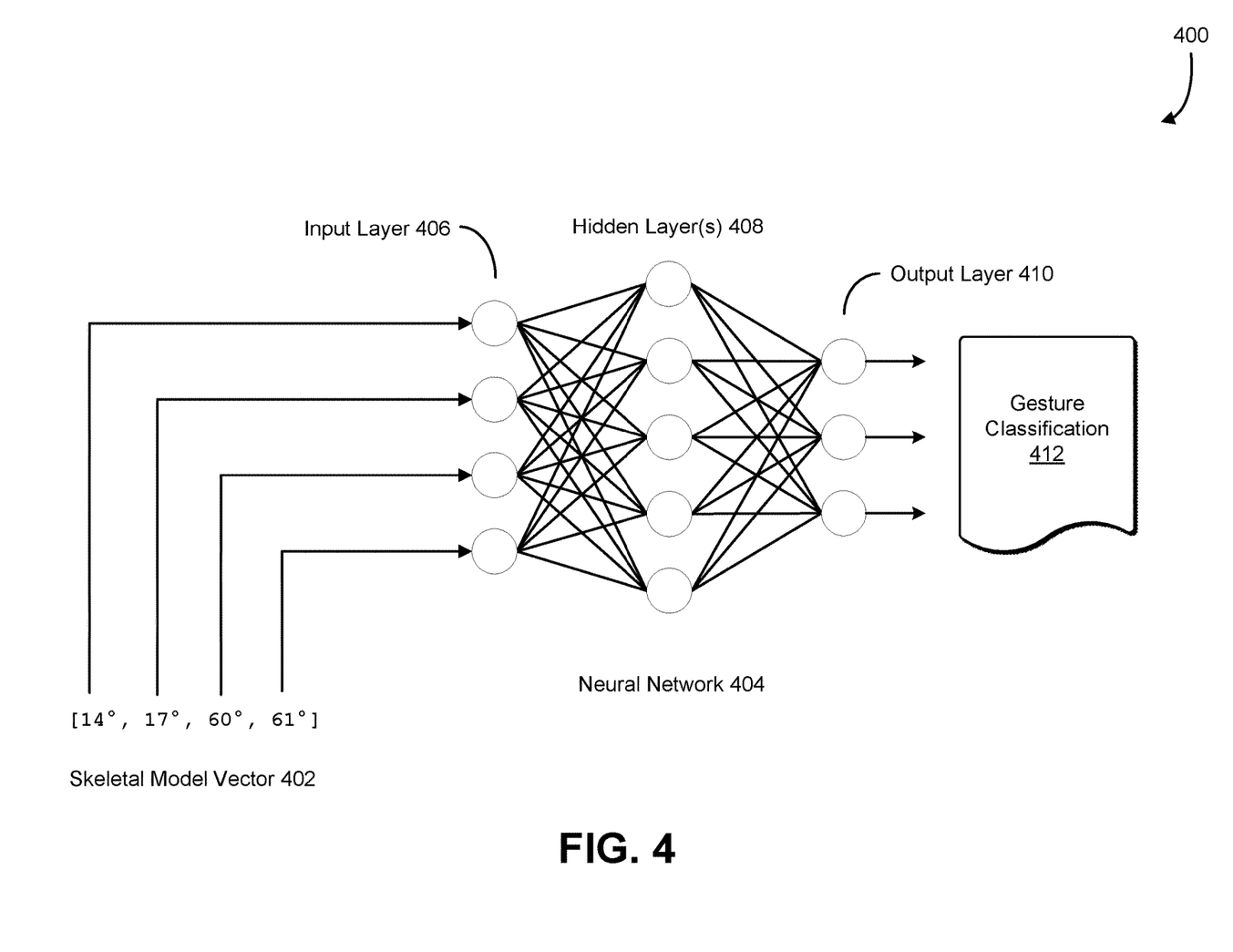
FIG. 4 illustrates an example of gesture classification using a neural network trained based on skeletal vector model data, in accordance with an embodiment.

FIG. 4 illustrates an example of gesture classification using a neural network trained based on skeletal vector model data, in accordance with an embodiment. In the example 400, a neural network 404 comprises an input layer 406, one or more hidden layers 408, and an output layer 410. In at least one embodiment, the respective layers are composed of nodes, which represent neurons and have respective parameters that are adjusted, during training. The layers 406, 408, 410 are connected, so that the output of the nodes in a given layer are supplied to a subsequent layer as input or, in the case of the output layer 410, produce a gesture classification 412. In at least one embodiment, gesture classification 412 comprises a selection or identification of a gesture that most closely corresponds to a gesture made by a participant, video data from which is processed according to the technique depicted in FIG. 1.

In at least one embodiment, the data supplied to the input layer 406, for both training and use of the neural network 404, comprises an ordered vector. In at least one embodiment, the ordered vector is a skeletal model vector 402, comprising values of attributes extracted from selected portions of a skeletal model as described in relation to FIGS. 2-3.

In at least one embodiment, particular elements of the skeletal model vector 402 are mapped to specific inputs of the input layer 406. This mapping is constant during both training and use of the neural network. In this way, each input to the neural network 404 corresponds to a particular part of a skeletal model, such as the angle of bone within a particular joint, and this correspondence remains in place for both training and use of the skeletal model.

Techniques for generating a skeletal model vector may be further enhanced by improvements directed to the generation of a skeletal model. FIG. 5 illustrates an example process for improving skeletal model generation, in accordance with an embodiment. In particular, the example process 500 depicts a technique for improving the generation of a skeletal model by leveraging a plurality of algorithms. In at least some embodiments, the algorithms operate on data acquired from different sensors, or from different angles or perspectives.

The operations of FIG. 5 pertain to the generation of a skeletal model, such as the generation of a skeletal model that might be performed by the corresponding skeletal model generation module that is depicted in FIG. 1.

At 502, a plurality of different algorithms are executed to generate a skeletal model. In at least one embodiment, the algorithms are of different types. A variety of algorithms might be employed to generate a skeletal model, and each type of model may have different strengths and weaknesses. These strengths and weaknesses may be more or less prominent depending on factors such as the subject, the nature of the motion being modelled, the lighting conditions, and so forth. Moreover, some algorithms may be better suited for use with incomplete data, while other algorithms may be better when used with complete or large data sets. In at least one embodiment, one or more of the skeletal model generation algorithms is adapted for use with a particular portion of anatomy, or is adapted for use at modelling particular types of motions, particularly those related to a gesture to be analyzed.

In at least one embodiment, different portions of a skeletal model are generated by different algorithms. In at least one embodiment, some portions of a skeletal model are generated by one or more algorithms of a first one or more types, and other portions of the same skeletal model are generated by one or more algorithms of a second one or more types.

In at least one embodiment, one or more algorithms related to modelling facial expression characteristics are used. Note that although the term skeletal model generally applies to characteristics of human or animal motion that can be modelled by bone and joint positions, a skeletal model is not necessarily limited to including bone and joint positions. In particular, certain other characteristics, such as those related to facial expressions, may also be included in a skeletal model.

In at least one embodiment, one of a plurality of algorithms is selected based on its efficiency at generating a complete skeletal model, while having less accuracy than other available generation algorithms. In at least one embodiment, another of the plurality of algorithms is selected based on its accuracy, but is applied to only a particular region of the model, such as the hands, that are relevant to the gestures that are to be classified. This algorithm may be less efficient than the algorithm used to generate the complete model, but can complete in about the same amount of time due to needing to process less data.

At 504, a plurality of algorithms are executed using data obtained from various sensors of different types. This refers to the algorithms being employed relying on different types of sensor data, such as visible or infrared wavelengths.

At 506, a plurality of algorithms are executed using data acquired from different perspectives. For example, two algorithms might be employed to do skeletal model generation, based on data acquired from cameras viewing the subject from two distinct angles. One of the cameras, depending on the position of the subject, may be in a better position than the other camera for producing the model, based on factors such as occlusion and lighting conditions.

At 508, a confidence voting process is performed. In at least one embodiment, confidence voting and merging comprises the formation of an estimate, for each algorithm, of that algorithm's reliability or trustworthiness.

In at least one embodiment, the confidence voting is based, at least in part, on data indicating conditions in which a particular algorithm is considered more trustworthy than others, or conditions in which a particular algorithm is considered less trustworthy. When conditions (such as lighting, angle, distance, and so forth) are considered favorable, that algorithm may be allocated more voting power than other algorithms.

In at least one embodiment, confidence voting is performed by a machine learning model, such as a neural network trained to perform a regression to estimate each algorithm's reliability.

At 510, in at least one embodiment, a consensus model is generated. In at least one embodiment, one or more confidence measures are associated with the output of each algorithm. The skeletal models generated by each algorithm can then be merged into a consensus model. For example, if an algorithm $M_1$ estimates a particular bone to be at an angle $A_1$, and an algorithm $M_2$ estimates the bone to be at an angle $A_2$, a consensus model can take an average of $A_1$ and $A_2$, weighted by the respective confidence in algorithms $M_1$ and $M_2$.

In at least one embodiment, a reference skeletal model is used, to represent typical positions and poses of a subject, in view of anatomical constraints.

In at least one embodiment, a neural network is trained to merge multiple skeletal models.

In at least one embodiment, a system comprises at least one processor and a memory comprising instructions that, in response to execution by the at least one processor, cause the system to obtain image data of a subject and generate a skeletal model based on the image data. The skeletal model comprises a plurality of joint angle values, each of which corresponds to one of a plurality of joints. Collectively, the joint angle values represent a pose of the subject that has been captured in the image data. Here, pose refer to the subject's position. The subject's pose, or position, may include position, configuration and orientation of the subject's body, including but not necessarily limited to hand position, configuration, and orientation of the subject's hands, of the subject's facial expression.

In at least one embodiment, the system's memory comprises further instructions that, when executed by the system's processor(s), cause the system to generate a vector based at least partially on the skeletal model. The vector comprises a subset of the joint angle values from the skeletal model. In at least one embodiment, these joint angle values correspond to a selected subset of joints defined in the skeletal model.

In at least one embodiment, the system's memory comprises further instructions that, when executed by the system's processor(s), cause the system to obtain a classification of a gesture based, at least in part, on evaluation of a neural network using the vector as input. As described herein, the neural network is trained using training vectors that each comprise joint angles corresponding to a selected subset of joints in the skeletal model.

In at least one embodiment, joints in skeletal model are included in the subject of joints mapped to the skeletal model vector, based on those joints being associated with the gesture in some way. Moreover, the skeletal model vector excludes at least some of the joints that make up the skeletal model. Note that this approach may convey certain advantages, such as allowing one skeletal model to be used to classify various types of gestures using separately trained neural networks, each using vectors generated from a different mapping.

In at least one embodiment, a vector used as input to a neural network in usage mode comprises joint angle values for less than all of the joint angle vectors used during training of the neural network. However, note that the respective positions of the supplied values is fixed, and that placeholder values (such as zero) may be used for values not extracted, during usage mode, from the skeletal model. Note that this approach may be possible due to certain values being identified, during training, as having little or no relevance to classification.

In at least one embodiment, the system's memory comprises further instructions that, when executed by the system's processor(s), cause the system to generate the skeletal model vector based at least partially on the skeletal model and one or more additional skeletal models, generated from the same image data. In at least one embodiment, multiple skeletal models are generated from the same frame of video data, although in some cases different frames of video data may be used.

In at least one embodiment, a first skeletal model is generated to represent the subject's overall pose, and a second skeletal model is generated to represent a specific subset of the pose, in greater detail than would be possible with the first skeletal model. For example, the first skeletal model might represent the subject's entire body, while one or more other skeletal models represent specific aspects such as the subject's hands or facial expression.

In at least one embodiment, a computer-implemented method for performing gesture classification comprises generating a skeletal model based on image data of a subject. The skeletal model comprises a joint angle values that correspond to or otherwise represent joints in the subject's anatomy, so that the skeletal model is representative of the subject's pose.

In at least one embodiment, the computer-implemented method further comprises generating a vector from the skeletal model. The vector is generated to comprise a subset of the joint angle values from the skeletal model. The subset corresponds to a defined subset of the model's joints. Here, the subset being defined may refer to the joints having been selected for inclusion in a mapping of attributes from the skeletal model to the vector. The defined subset of joints excludes at least some joints or other attributes that are included in the model.

In at least one embodiment, the computer-implemented method further comprises classifying a gesture made by the subject (and captured in the image data) by evaluating a neural network. Inputs to the neural network comprise the vector. Moreover, the neural network is trained using training vectors whose composition is the same as the vector, e.g. whose joint angle values correspond to joints in the defined subset of joints.

In at least one embodiment, the computer-implemented method further comprises locating a joint in the skeletal model, and copying a joint angle value from the joint to a mapped position in the first vector. Each position in the vector may be considered fixed, in that the position is mapped to a particular joint, or a particular attribute of a particular joint.

In at least one embodiment, the computer-implemented method further comprises generating the vector such that it comprises less than all of joint angle values that were used in training vectors used to train the neural network. Note, however, that the values that are included in the vector retain the same meaning they had during training, i.e., they correspond to the same attribute of the same joint. Placeholder values may be used for any attributes used during training but not included in the vector during usage of the neural network.

In at least one embodiment, the computer-implemented method further comprises generating a consensus skeletal model based on a plurality of skeletal models, and generating a skeletal model vector based on the consensus skeletal model. In at least one embodiment, one or more of the skeletal models is specialized for a particular part of the body, such as the hands, or to represent facial expressions. In at least one embodiment, one or more of the skeletal models is generated from video data taken from alternative perspectives.

In at least one embodiment, a non-transitory computer-readable storage medium has stored instructions that, when executed by at least one processor of a computing device, cause the computing device to perform any of the embodiments of the computer-implemented method just described.

Embodiments of the present disclosure may be further understood in view of the following clauses:

1. A system, comprising:
   at least one processor;
   a memory comprising instructions that, in response to execution by the at least one processor, cause the system to at least:
   obtain image data of a subject;
   generate a skeletal model based at least in part on the image data, the skeletal model comprising a plurality of joint angle values corresponding to a plurality of joints, the plurality of joint angle values representative of a pose of the subject in the image data;
   generate a first vector based at least in part on the skeletal model, the first vector comprising a subset of the plurality of joint angle values corresponding to a selected subset of the plurality of joint; and
   obtain a classification of a gesture based, at least in part, on evaluation of a neural network using the first vector as input, the neural network trained based at least in part on a plurality of training vectors, the plurality of training vectors each comprising a plurality of joint angle values corresponding to the selected subset of the plurality of joints.

2. The system of clause 1, wherein joints in the selected subset of the plurality of joints are selected based at least in part on an association of the joints with the gesture.

3. The system of any of clauses 1-2, wherein the selected subset of the plurality of joints excludes one or more joints of the plurality of joints of the skeletal model.

4. The system of any of clauses 1-3, wherein the first vector comprises joint angle values for less than all of joint angle vectors in the training vectors used to train the neural network.

5. The system of any of clauses 1-4, the memory comprising instructions that, in response to execution by the at least one processor, cause the system to at least:
   generate the first vector based at least in part on the skeletal model and one or more additional skeletal models generated based at least in part on the image data.

6. The system of clause 5, wherein the skeletal model represents the pose and the one or more additional skeletal models each represent a subset of the pose.

7. A computer-implemented method, comprising:
   generating a skeletal model based at least in part on image data of a subject, wherein the skeletal model comprises a plurality of joint angle values corresponding to a plurality of joints, the skeletal model representative of a pose of the subject in the image data;
   generating a first vector from the skeletal model, the first vector comprising a subset of the plurality of joint angle values corresponding to a defined subset of the plurality of joints; and
   classifying a gesture of the subject based, at least in part, on evaluating a neural network using inputs comprising the first vector, wherein the neural network is trained based at least in part on a plurality of training vectors, wherein a training vector, of the plurality of training vectors, comprises a plurality of joint angle values corresponding to the defined subset of the plurality of joints.

8. The method of clause 7, further comprising:
   locating a joint in the skeletal model; and
   copying a joint angle value associated with the joint to a mapped position in the first vector.

9. The method of any of clauses 7-8, wherein the defined subset of the plurality of joints excludes one or more joints of the plurality of joints of the skeletal model.

10. The method of any of clauses 7-9, further comprising:
    generating the first vector to comprise less than all of joint angle vectors in the training vectors used to train the neural network.

11. The method of any of clauses 7-10, further comprising:
    generating a consensus skeletal model based, at least in part, on the skeletal model and one or more additional skeletal models; and generating the first vector based at least in part on the consensus skeletal model.

12. The method of clause 11, wherein at least one of the one or more additional skeletal models excludes portions of the subject not associated with one or more gestures to be classified.

13. The method of any of clauses 11-12, wherein at least one of the one or more additional skeletal models is generated from additional video data taken from an additional perspective other than a perspective used to obtain the video data.

14. A non-transitory computer-readable storage medium having stored thereon instructions that, in response to execution by at least one processor of a computing device, cause the computing device to at least:

generate a skeletal model based at least in part on image data of a subject, wherein the skeletal model comprises a plurality of joint angle values corresponding to a plurality of joints, the skeletal model representative of a pose of the subject in the image data;

generate a first vector from the skeletal model, the first vector comprising a subset of the plurality of joint angle values corresponding to a defined subset of the plurality of joints; and classify a gesture of the subject based, at least in part, on evaluating a neural network using inputs comprising the first vector, wherein the neural network is trained based at least in part on a plurality of training vectors, wherein a training vector, of the plurality of training vectors, comprises a plurality of joint angle values corresponding to the defined subset of the plurality of joints.

15. The non-transitory computer-readable storage medium of clause 14, having stored thereon instructions that, in response to execution by at least one processor of the computing device, cause the computing device to at least:

locate a joint in the skeletal model; and copy a joint angle value associated with the joint to a mapped position in the first vector.

16. The non-transitory computer-readable storage medium of any of clauses 14-15, wherein the defined subset of the plurality of joints excludes one or more joints of the plurality of joints of the skeletal model.

17. The non-transitory computer-readable storage medium of any of clauses 14-16, having stored thereon instructions that, in response to execution by at least one processor of the computing device, cause the computing device to at least:

generate the first vector to comprise less than all of joint angle vectors in the training vectors used to train the neural network.

18. The non-transitory computer-readable storage medium of any of clauses 14-17, having stored thereon instructions that, in response to execution by at least one processor of the computing device, cause the computing device to at least:

generate a consensus skeletal model based, at least in part, on the skeletal model and one or more additional skeletal models; and generate the first vector based at least in part on the consensus skeletal model.

19. The non-transitory computer-readable storage medium of clause 18, wherein at least one of the one or more additional skeletal models excludes portions of the subject not associated with one or more gestures to be classified.

20. The non-transitory computer-readable storage medium of any of clauses 18-19, wherein at least one of the one or more additional skeletal models is generated from additional video data taken from an additional perspective other than a perspective used to obtain the video data.

Figure 6:
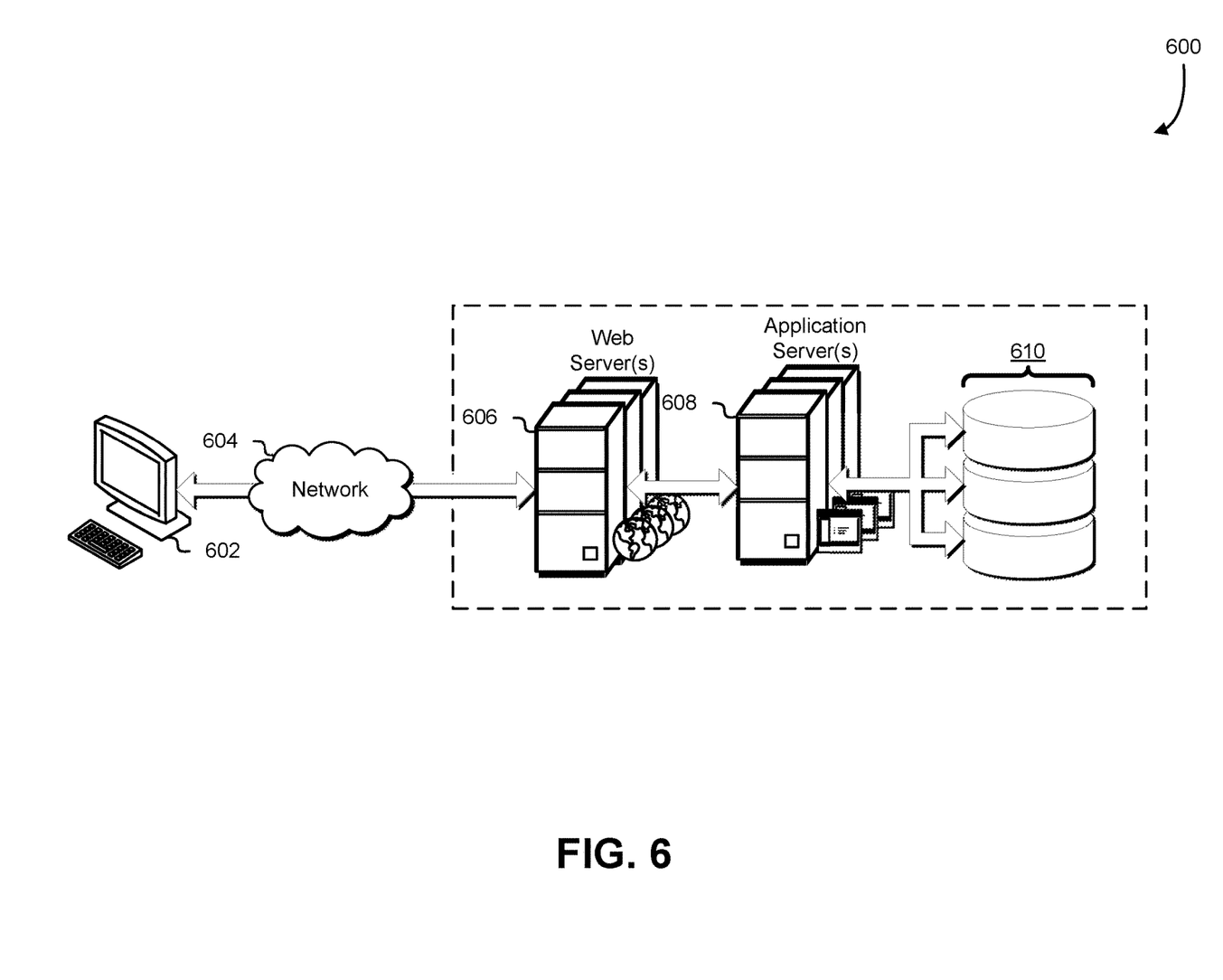
FIG. 6 illustrates an environment in which various embodiments can be implemented.

FIG. 6 illustrates aspects of an example environment 600 for implementing aspects in accordance with various embodiments. As will be appreciated, although a web-based environment is used for purposes of explanation, different environments may be used, as appropriate, to implement various embodiments. The environment includes an electronic client device 602, which can include any appropriate device operable to send and/or receive requests, messages, or information over an appropriate network 604 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 600 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 6. Thus, the depiction in FIG. 6 should be taken as being illustrative in nature and not limiting to the scope of the disclosure.

The network 604 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 604 are well known and will not be discussed in detail. Communication over the network 604 can be enabled by wired or wireless connections and combinations thereof. In an embodiment, the network 604 includes the Internet and/or other publicly addressable communications network, as the environment 600 includes one or more web servers 606 for receiving requests and serving content in response thereto, although for other networks an alternative device serving a similar purpose could be used as would be apparent to one of ordinary skill in the art.

The illustrative environment 600 includes one or more application servers 608 and data storage 610. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 608 can include any appropriate hardware, software and firmware for integrating with the data storage 610 as needed to execute aspects of one or more applications for the electronic client device 602, handling some or all of the data access and business logic for an application. The one or more application servers 608 may provide access control services in cooperation with the data storage 610 and is able to generate content including, text, graphics, audio, video, and/or other content usable to be provided to the user, which may be served to the user by the one or more web servers 606 in the form of HyperText Markup Language (HTML), Extensible Markup Language (XML), JavaScript, Cascading Style Sheets (CS S), JavaScript Object Notation (JSON), and/or another appropriate client-side structured language. Content transferred to the electronic client device 602 may be processed by the electronic client device 602 to provide the content in one or more forms including forms that are perceptible to the user audibly, visually, and/or through other senses. The handling of all requests and responses, as well as the delivery of content between the electronic client device 602 and the one or more application servers 608, can be handled by the one or more web servers 606 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 610 can include several separate data tables, databases, data documents, dynamic data storage schemes, and/or other data storage mechanisms and media for storing data relating to a particular aspect of the present disclosure. For example, the data storage 610 may include mechanisms for storing various types of data and user information, which can be used to serve content to the electronic client device 602. The data storage 610 also is shown to include a mechanism for storing log data, such as application logs, system logs, access logs, and/or various other event logs, which can be used for reporting, analysis, or other purposes. It should be understood that there can be many other aspects that may need to be stored in the data storage 610, such as page image information and access rights information, which can be stored in any of the above listed mechanisms as appropriate or in additional mechanisms in the data storage 610. The data storage 610 is operable, through logic associated therewith, to receive instructions from the one or more application servers 608 and obtain, update, or otherwise process data in response thereto. The one or more application servers 608 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 608.

In one embodiment, a user, through a device operated by the user, can submit a search request for a match to a particular search term. In this embodiment, the data storage 610 might access the user information to verify the identity of the user and obtain information about items of that type. The information then can be returned to the user, such as in a results listing on a web page that the user is able to view via a browser on the electronic client device 602. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 604. These devices also can include virtual devices such as virtual machines, hypervisors, and other virtual devices capable of communicating via the network 604.

Various embodiments of the present disclosure utilize the network 604 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 604 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 606, the one or more web servers 606 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 600 can include a variety of data stores and other memory and storage media as discussed above. These can reside in a variety of locations, such as on a storage medium local to (and/or resident in) one or more of the computers or remote from any or all of the computers across the network 604. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system, comprising:
   at least one processor; and
   a memory comprising instructions that, in response to execution by the at least one processor, cause the system to at least:
      obtain image data of a subject;
      generate a skeletal model based at least in part on the image data, the skeletal model comprising a plurality of joint angle values corresponding to a plurality of joints, the plurality of joint angle values representative of a pose of the subject in the image data;
      generate a first vector from selected portions of the skeletal model, the first vector comprising a subset of the plurality of joint angle values representative of the pose of the subject, the subset of the plurality of joint angle values corresponding to a selected subset of the plurality of joints; and
      obtain a classification of a gesture based, at least in part, on evaluation of a neural network using the first vector as input to the neural network, the neural network trained based at least in part on a plurality of training vectors used as input to the neural network during training, the plurality of training vectors each comprising a plurality of joint angle values corresponding to the selected subset of the plurality of joints.

2. The system of claim 1, wherein joints in the selected subset of the plurality of joints are selected based at least in part on an association of the joints with the gesture.

3. The system of claim 1, wherein the selected subset of the plurality of joints excludes one or more joints of the plurality of joints of the skeletal model.

4. The system of claim 1, wherein the first vector comprises joint angle values for less than all of joint angle vectors in the training vectors used to train the neural network.

5. The system of claim 1, the memory comprising instructions that, in response to execution by the at least one processor, cause the system to at least:
   generate the first vector based at least in part on a consensus model generated based at least in part on a plurality of skeletal models, the plurality of skeletal models comprising the skeletal model.

6. The system of claim 5, wherein a first skeletal model, of the plurality of skeletal models, represents the pose of the subject, and a second skeletal model, of the plurality of skeletal models, represents a portion of the pose, the second skeletal model having greater detail associated with the portion than the first skeletal model.

7. A computer-implemented method, comprising:
   generating a skeletal model based at least in part on image data of a subject, wherein the skeletal model comprises a plurality of joint angle values corresponding to a plurality of joints, the skeletal model representative of a pose of the subject in the image data;

generating a first vector from the skeletal model, the first vector comprising a subset of the plurality of joint angle values corresponding to a defined subset of the plurality of joints; and classifying a gesture of the subject based, at least in part, on evaluating a neural network using inputs comprising the first vector, wherein the neural network is trained based at least in part on input to the neural network comprising a plurality of training vectors, wherein a training vector, of the plurality of training vectors, comprises a plurality of joint angle values corresponding to the defined subset of the plurality of joints.

8. The method of claim 7, further comprising:
locating a joint in the skeletal model; and
   copying a joint angle value associated with the joint to a mapped position in the first vector.

9. The method of claim 7, wherein the defined subset of the plurality of joints excludes one or more joints of the plurality of joints of the skeletal model.

10. The method of claim 7, further comprising:
generating the first vector to comprise less than all of joint angle vectors in the training vectors used to train the neural network.

11. The method of claim 7, further comprising:
generating a consensus skeletal model based, at least in part, on the skeletal model and one or more additional skeletal models; and
generating the first vector based at least in part on the consensus skeletal model.

12. The method of claim 11, wherein at least one of the one or more additional skeletal models excludes portions of the subject not associated with one or more gestures to be classified.

13. The method of claim 11, wherein at least one of the one or more additional skeletal models is generated from additional video data taken from an additional perspective other than a perspective used to obtain the video data.

14. A non-transitory computer-readable storage medium having stored thereon instructions that, in response to execution by at least one processor of a computing device, cause the computing device to at least:
generate a skeletal model based at least in part on image data of a subject, wherein the skeletal model comprises a plurality of joint angle values corresponding to a plurality of joints, the skeletal model representative of a pose of the subject in the image data;
generate a first vector from the skeletal model, the first vector comprising a subset of the plurality of joint angle values corresponding to a defined subset of the plurality of joints; and
classify a gesture of the subject based, at least in part, on evaluating a neural network using inputs to the neural network comprising the first vector, wherein the neural network is trained based at least in part on input to the neural network comprising a plurality of training vectors, wherein a training vector, of the plurality of training vectors, comprises a plurality of joint angle values corresponding to the defined subset of the plurality of joints.

15. The non-transitory computer-readable storage medium of claim 14, having stored thereon instructions that, in response to execution by at least one processor of the computing device, cause the computing device to at least:
locate a joint in the skeletal model; and
   copy a joint angle value associated with the joint to a mapped position in the first vector.

16. The non-transitory computer-readable storage medium of claim 14, wherein the defined subset of the plurality of joints excludes one or more joints of the plurality of joints of the skeletal model.

17. The non-transitory computer-readable storage medium of claim 14, having stored thereon instructions that, in response to execution by at least one processor of the computing device, cause the computing device to at least:
generate the first vector to comprise less than all of joint angle vectors in the training vectors used to train the neural network.

18. The non-transitory computer-readable storage medium of claim 14, having stored thereon instructions that, in response to execution by at least one processor of the computing device, cause the computing device to at least:
generate a consensus skeletal model based, at least in part, on the skeletal model and one or more additional skeletal models; and
generate the first vector based at least in part on the consensus skeletal model.

19. The non-transitory computer-readable storage medium of claim 18, wherein at least one of the one or more additional skeletal models excludes portions of the subject not associated with one or more gestures to be classified.

20. The non-transitory computer-readable storage medium of claim 18, wherein at least one of the one or more additional skeletal models is generated from additional video data taken from an additional perspective other than a perspective used to obtain the video data.

* * * * *